May 14, 1963  S. SHARKO ETAL  3,089,331
PITOT STATIC TESTER
Filed Jan. 23, 1961  2 Sheets-Sheet 1
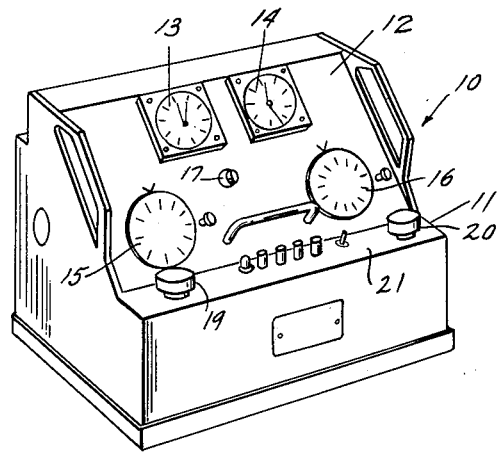
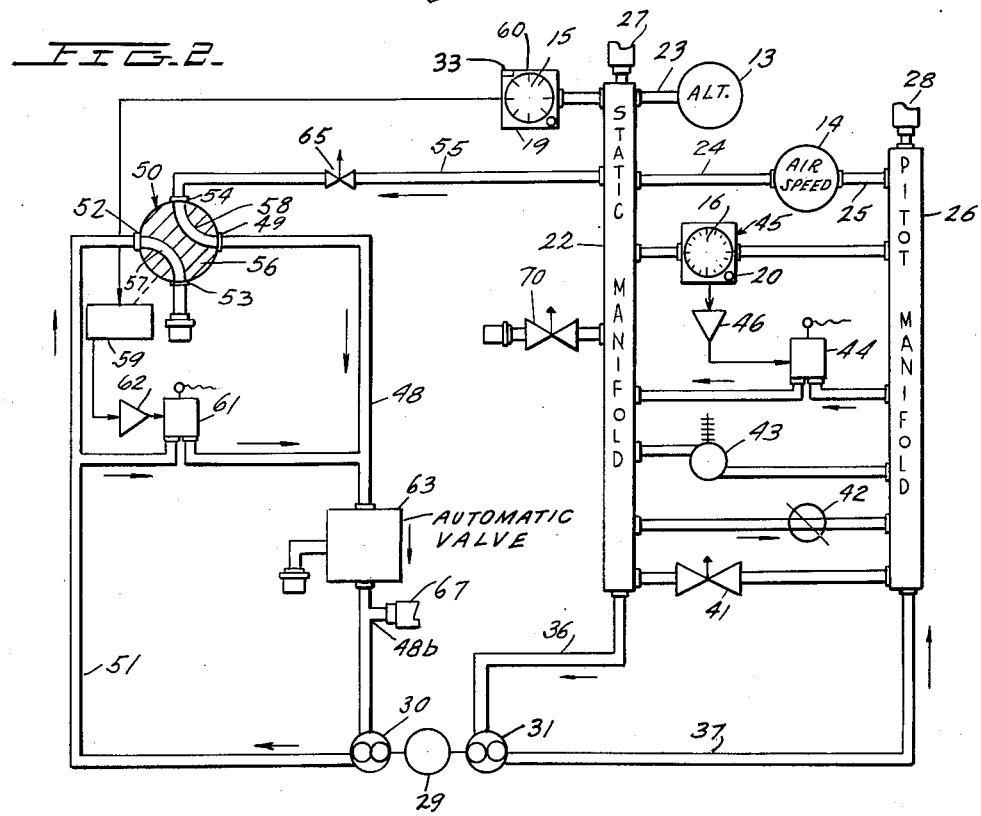
INVENTORS
SAM SHARKO
JOSHUA SALEM
BY  JOHN H. ANDRESEN, JR.
OSTROLENK, FABER, GERB & SOFFEN
ATTORNEYS INVENTORS
SAM SHARKO
JOSHUA SALEM
BY JOHN H. ANDRESEN, JR.
OSTROLENK, FABER, GERB & SOFFEN
ATTORNEYS

United States Patent Office 3,089,331
Patented May 14, 1963

3,089,331
PITOT STATIC TESTER
Sam Sharko, Bayside, N.Y., Joshua Salem, Paramus, N.J., and John H. Andresen, Jr., Greenwood Lake, N.Y., assignors to Intercontinental Dynamics Corporation, Englewood, N.J., a corporation of New York
Filed Jan. 23, 1961, Ser. No. 84,334
14 Claims. (Cl. 73—4)

This invention relates to instrument test devices having variable pressure systems and more particularly to a test device of this type which is made extremely accurate by utilizing electronic servos to control valves of novel construction and by referencing the pressure at the Pitot mainfold to the pressure at the static manifold.

The testing of air data instruments such as altimeter airspeed indicator Mach meters, engine pressure ratio indicators, flight recorders, altitude and airspeed holding devices for autopilots and other instruments requires an absolute pressure and a higher pressure differing from this absolute pressure by a regulated fixed amount. Thus, the device of this invention includes a static manifold which is connectible to the static pressure port of an aircraft and a Pitot manifold which is connectible to the Pitot inlet port of the aircraft.

A first pump is provided to establish the pressure within the static manifold. This is usually a vacuum (a pressure below ambient) but on occasion the static manifold pressure may be above that of ambient. For example, at a high altitude location such as Denver, Colorado, when it is required to simulate pressure at sea level, the static manifold pressure must exceed ambient pressure. Whether the first pump produces a pressure or vacuum with respect to ambient at the static manifold is determined by the setting of a simple two way altitude selector valve.

The device further includes a second pump to establish a pressure in the Pitot manifold which is referenced to, and is always greater than the pressure within the static manifold though not necessarily greater than ambient pressure. This second pump acts by drawing air from the static pressure manifold and pumping it into the Pitot manifold. Pitot pressure is regulated relative to the static pressure so that if static pressure should be readjusted, the differential between Pitot and static remains fixed. Static pressure is regulated relative to a true vacuum so as not to be affected by changes in ambient atmospheric pressure due to wind or barometric pressure, and, in the case of bench testing, by plant air conditioning. Since the Pitot pressure regulation system senses the difference between Pitot and static pressures, rather than between Pitot pressure and ambient, the Pitot pressure also is independent of ambient temperature change.

Accurate control of static and Pitot pressures are obtained by utilizing a transducing system including an electronic high gain amplifier servo loop to control the opening of a proportional solenoid control valve. By utilizing electronic servos in the regulation system faster response and closer regulation of Pitot and static pressures is obtained in the event of changes in air supply or extraneous leaks than is obtainable by prior art devices utilizing mechanical pneumatic servo systems, such as manostats or diaphragm control valves.

The static, or S, pressure controlling transducer includes a selector dial which is settable at the desired altitude. However, an accurate altitude readout is obtained by reference to a calibrated altimeter which is connected to the static manifold. Error signals fed by the static controlling transducer through a reversing switch connected to the altitude selector knob selectively arranges the static pump and control valve so that pressure at the static manifold is controlled either above or below ambient. The control valve bleeds ambient air to the static manifold in sufficient quantity to regulate the S pressure at the chosen value.

In a similar manner, the Pitot, or P, pressure controlling transducer includes a selector dial which is set to a desired differential pressure. However, an accurate air speed readout is obtained by reference to the calibrated air speed indicator connected to the static and Pitot manifolds. Error signals are fed by the Pitot pressure controlling transducer to the Pitot control valve which modulates the flow of air from the Pitot manifold back into the static manifold so as to regulate the differential pressure between the Pitot and static manifolds at the selected value.

Each of the control valves previously mentioned comprises a solenoid whose control current is governed by the respective servo. The solenoid plunger is provided at its bottom end with a resilient slab which is biased toward a seat having a port communicating with one of the valve inlets. Plunger position is determined by the magnitude of control current.

When the plunger is positioned so that the resilient slab is not distorted the surface thereof which engages the seat is inclined with respect to the seat. It has been found that by positioning the resilient member and valve seat at an incline with respect to each other it is possible to obtain control of small volumes of fluid since the opening of the valve orifice increases gradually with increase in control current during the time when the resilient member is in contact with the inclined seat.

Accordingly, a primary object of this invention is to provide a novel Pitot-static tester which is more accurate and less sensitive to environmental changes than similar devices of the prior art.

Another object is to provide a Pitot static tester in which the Pitot pressure is referenced directly to static pressure.

Still another object is to provide a Pitot static tester which utilizes electronic servo means for maintaining pressure at a constant level.

A further object is to provide a fluid control valve having relatively movable parts one of which has a resilient planar surface operable into and out of engagement with an inclined seat of the other part having a valve port therein.

These as well as other objects of this invention shall readily become apparent after reading the following description of the accompanying drawings in which:

FIGURE 1 is a perspective of a Pitot static tester constructed in accordance with the teachings of the instant invention.

FIGURE 2 is a schematic of the Pitot static tester of FIGURE 1.

Figures 3, 4:
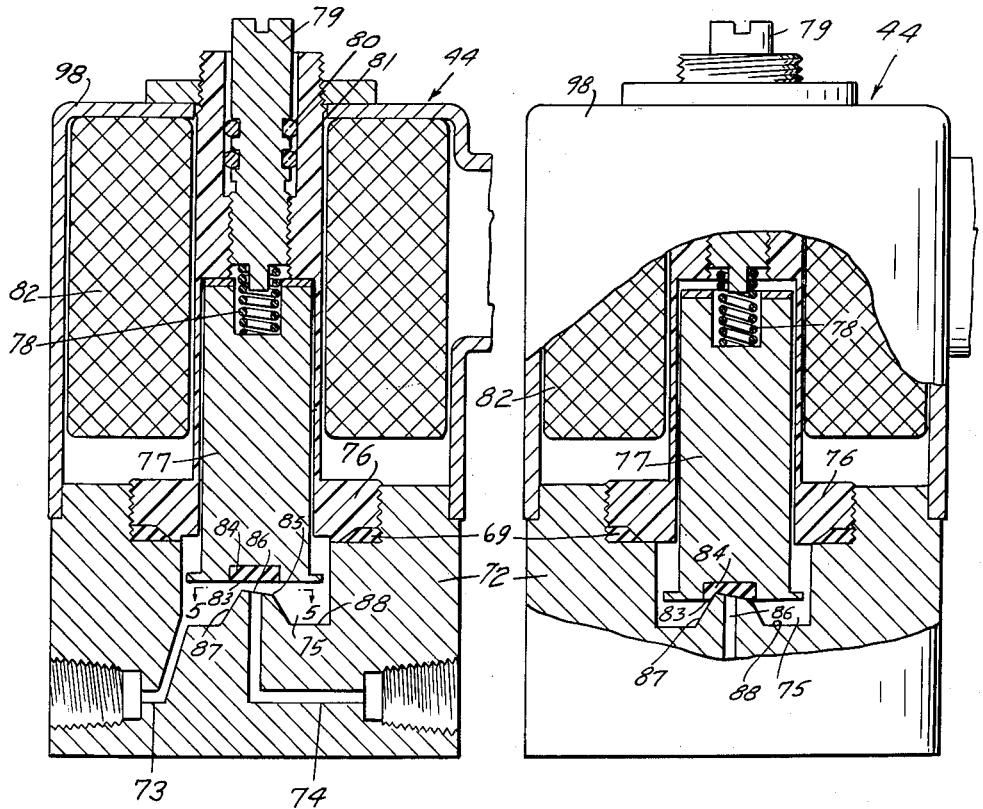
FIGURE 3 is a side elevation, partly sectioned, of one of the control valves of FIGURE 2 with the valve closed.
FIGURE 4 is a longitudinal cross-section of the valve of FIGURE 3.

Now referring more particularly to the FIGURES 1 and 2, Pitot static tester 10 includes a housing 11 having an inclined panel 12 with calibrated altimeter 13 and calibrated air speed indicator 14 mounted thereto. Also mounted to panel 12 are indicator dials 15, 16 for setting the tester 10 to produce the desired pressures. Dial 15 indicates altitude setting while dial 16 indicates air speed setting.

Further, mounted to panel 12 are valve selector knobs 17 whose function will be hereinafter explained. Knobs 19, 20, respectively, mounted to a horizontal forward extension 21 of panel 12 are used to equalize Pitot and static pressure to ambient when there is no electrical power.

Referring to FIGURE 2, conduits 23, 24 connect altimeter 13 and air speed indicator 14, respectively, directly to static manifold 22 while conduit 25 connects air speed indicator 14 directly to Pitot manifold 26. Flexible lines 27, 28 extending from manifolds 22, 26, respectively, are adapted to be connected to the static and Pitot ports of the aircraft whose instruments are under test or to an instrument or instruments on the bench under test.

Electric motor 29 drives air pumps 30, 31 which establish the pressure within manifolds 22, 26, respectively. The inlet, or low pressure side, of pump 31 is connected through conduit 36 to static manifold 22 while the outlet, or high pressure side, is connected through conduit 37 to Pitot manifold 26.

Also connected directly between manifolds 22, 26 by individual conduit means are Pitot bleed valve 41, Pitot check valve 42, Pitot relief valve 43, Pitot control valve 44, and the differential pressure transducer unit 45 comprising an electronic servo. The correction signal developed by transducer 45 is fed through amplifier 46 to supply an activating current for solenoid control valve 44 whose construction will hereinafter be explained.

Valve 41 permits manual bleeding of air between the Pitot 26 and static 22 manifolds as well as between Pitot manifold and the atmosphere. Valve 70 connected to static manifold 22 is provided for bleeding air between the static manifold 22 and the atmosphere.

Transducer unit 45 compares the pressures in manifolds 22, 26 and is constructed to send control current to valve 44 with the current magnitude being in proportion to the difference between the manifold pressures and the value of this difference set on dial 16. Thus, the pressure in Pitot manifold 26 is maintained at a constant differential above the pressure in static manifold 22.

The low pressure inlet of pump 30 is connected through conduit 48 to port 49 of selector valve 50 while the high pressure outlet is connected through conduit 51 to port 52 which is 180° from port 49. Valve 50 also includes port 53 connected to ambient pressure and port 54 connected to static manifold 22 by means of conduit 55. Ports 53 and 54 are spaced 180° from each other and 90° from ports 49 and 52.

Rotatable valve member 56 is movable by valve selector knob 17. Member 56 includes through passage 57 which connects ports 52, 53 and through passage 58 which connects ports 49, 54, when member 56 is in the position shown. By rotating member 56 by 90° ports 52, 54 are connected as are ports 49, 53.

With valve member 56 in the position illustrated, pump 30 will establish a vacuum relative to ambient in static manifold 22. When member 56 is rotated 90° pressure above ambient will be introduced into static manifold 22 by pump 30.

The static transducer 60, comprising an electronic servo, compares the pressure in static manifold 22 with that of a true vacuum in a diaphragm capsule or standard 33, of a type well known to the art, and develops a correction signal which is in proportion to the difference between the setting of indicator 15 and the absolute pressure in the static manifold. The correction signal is sent through reversing switch 59 to amplifier 62 which sends a control current of the proper magnitude to valve 61. Switch 59 is connected to movable valve member 56 so as to be operated in unison therewith and thereby establish the polarity of the correction signal as it appears at amplifier 62.

Valve 61 is connected to conduits 51 and 48. Operation of valve 61 by transducer unit 60 will vary the difference between pressure in manifold 22 and ambient pressure according to commands from transducer 60.

Valve 63, located in conduit 48, is constructed to stay closed until vacuum led to flexible line 67 is a predetermined amount relative to ambient pressure. At high vacuums valve 63 opens fully.

A quick coupling device is provided at location 48b of conduit 48 for utilization of vacuum line 67 which is used with other devices such as the static port adaptor fitting illustrated in the copending application 859,652, filed December 15, 1959. Valve 65, operated by knob 18, is provided to limit the rate of change of altitude in manifold 22.

At this time it is noted that the arrows alongside of the conduits illustrate the directions of air flow with selector valve 50 in the position illustrated wherein static manifold pressure will be below the ambient pressure.

The constructions of control valves 44 and 61 are substantially identical so that for the sake of brevity only the construction of valve 44 will be described by reference to FIGURES 3–5. Valve 44 comprises a stationary member 72 having inlet and outlet passages 73, 74 communicating with central chamber 75. Guide piece 76, threadably secured to member 72, cooperates with movable valve member 77 and a central depression of member 72 to form chamber 75. Below the bottom portion of the guide piece 76 threads is a ring gasket 69 of resilient material to provide a fluid seal.

Movable member 77 is disposed within the enlarged bottom portion of the central bore extending through guide piece 76. Compression spring 78 bears against the top of movable member 77 and adjusting plug 79 to urge member 77 downward. Plug 79 is threadably mounted in the narrow upper portion of the guide piece bore. O-rings 80, 81 disposed in annular bores in the outer surface of plug 79 provide the fluid seal between plug 79 and guide piece 76.

Coil 82 surrounds guide piece 76 and is in turn enclosed within housing 98 secured to the top of stationary member 72. The control current generated by amplifier 46 in response to the correction signal of transducer 45 causes coil 82 to generate a magnetic flux field whose lines pass through movable member 77 forcing it upward against the force of biasing spring 78.

Figure 5:
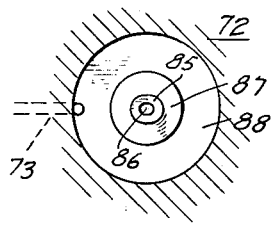
FIGURE 5 is a cross-section taken through line 5—5 of FIGURE 4 looking in the direction of arrows 5—5.

When coil 82 is deenergized the planar surface 83 of the slab-like resilient insert 84 at the bottom of movable member rests against valve seat 85 (FIGURE 3). Port 86 at one end of passage 74 is formed in seat 85 which is formed at the top of conical protrusion 87 extending upwardly from the bottom wall 88 of chamber 75.

It is to be noted that seat 85 is in a plane which is inclined with respect to the planar surface 83 of resilient insert 84 and that surface 83 is perpendicular to the path of movement of movable member 77. With this arrangement of inclined surfaces, one of which is resilient, port 86 is gradually opened as movable member 77 is moved upwardly to the position of FIGURE 4 wherein valve 44 is fully open. This gradual opening of port 86 results in a precise control of small volumes of fluid.

Pitot static tester 10 is operated by first lines 27, 28 from manifolds 22, 26 to the appropriate instrument or aircraft ports. Indicator dial 15 is set to the approximate altitude which is to be simulated. The position of valve 50 is selected by knob 17 in accordance with whether the altitude setting is above or below the ambient altitude. Indicator dial 16 is set to the approximate air speed which is to be simulated.

Pumps 30, 31 then establish the appropriate pressures within manifolds 22—26 to obtain the altitude and air speed which are to be simulated. Final adjustments are made by reference to the tester calibrated instruments 13, 14.

The electronic transducers 45, 60 operating in conjunction with amplifiers 46, 62 and control valves 44 and 61 maintain the manifold pressures constant at the desired value. It is noted that the Pitot manifold pressure is referenced to the static manifold pressure and the static manifold is referenced to a vacuum so that it is always at the desired level for test purposes regardless of environmental changes in pressure.

Although there has been described preferred embodiments of this invention, many variations and modifications will now be evident to those skilled in the art and, therefore, the scope of this invention is to be limited not by the specific disclosure herein detailed, but only by the appended claims.

We claim:

1. An air data calibrator comprising a first and a second manifold, a first means for establishing a first pressure in said first manifold, a second means for establishing a second pressure in said second manifold, first servo means for maintaining said first pressure referenced to a vacuum, second servo means for maintaining said second pressure referenced to said first pressure.

2. An air data calibrator comprising a first and a second manifold, a first means for establishing a first pressure in said first manifold, a second means for establishing a second pressure in said second manifold, first servo means for maintaining said first pressure referenced to a vacuum, second servo means for maintaining said second pressure referenced to said first pressure; said first means comprising a pump having an intake and an outlet; a selector valve operatively connected between said pump and said first manifold; said selector valve being operable between a first and a second position wherein said intake and said outlet, respectively, are connected to said first manifold whereby said first pressure is selectively below or above ambient.

3. An air data calibrator comprising a first and a second manifold, a first means for establishing a first pressure in said first manifold, a second means for establishing a second pressure in said second manifold, first servo means for maintaining said first pressure referenced to a vacuum, second servo means for maintaining said second pressure referenced to said first pressure; said servo means comprising electronic devices.

4. An air data calibrator comprising a first and a second manifold, a first means for establishing a first pressure in said first manifold, a second means for establishing a second pressure in said second manifold, first servo means for maintaining said first pressure referenced to a vacuum, second servo means for maintaining said second pressure referenced to said first pressure; a first valve connected from said first manifold to ambient including a movable element whose position is controlled by said first servo means for maintaining said first pressure substantially constant relative to a vacuum; a second valve connected between said manifold and having a movable element whose position is controlled by said second servo means for maintaining said second pressure substantially constant relative to said first pressure.

5. The calibrator as set forth in claim 4 in which the first means comprises a pump having an intake and an outlet; a selector valve operatively connected between said pump and said first manifold; said selector valve being operable between a first and a second position wherein said intake and said outlet, respectively, are connected to said first manifold whereby said first pressure is selectively below or above ambient.

6. An air data calibrator comprising a first and a second manifold, a first means for establishing a first pressure in said first manifold, a second means for establishing a second pressure in said second manifold, and servo means for maintaining said second pressure referenced to said first pressure, a valve connected between said manifolds including a movable element whose position is controlled by said servo means for maintaining said second pressure substantially constant relative to said first pressure; said valve also including a stationary element; one of said elements having an inlet passage, an outlet passage, and means defining a seat provided with a port connecting said passages; the other of said elements including a slab-like resilient member including a planar surface engageable with and disengageable from said seat; said surface, when disengaged from said plate, being flat and positioned at an incline with respect to said seat whereby said port is gradually closed by said resilient member as said movable element moves toward said stationary element.

7. An air data calibrator comprising a first and a second manifold, a first means for establishing a first pressure in said first manifold, a second means for establishing a second pressure in said second manifold, and servo means for maintaining said second pressure referenced to said first pressure, a valve connected between said manifolds including a movable element whose position is controlled by said servo means for maintaining said second pressure substantially constant relative to said first pressure; said valve also including a stationary element; one of said elements having an inlet passage, an outlet passage, a means defining a seat provided with a port connecting said passages; the other of said elements including a slab-like resilient member including a planar surface engageable with and disengageable from said seat; said surface, when disengaged from said plate, being flat and positioned at an incline with respect to said seat whereby said port is gradually closed by said resilient member as said movable element moves toward said stationary element; biasing means urging said movable element away from said stationary element; magnetic means energizable by said servo means for moving said movable element toward said stationary element against the force of said biasing spring to control the opening of said port.

8. A control valve comprising a movable element and a stationary element; one of said elements having an inlet passage, an outlet passage, and means defining a seat provided with a port connecting said passages; the other of said elements including a slab-like resilient member including a planar surface engageable with and disengageable from said seat; said surface when disengaged from said plate being flat and positioned at an incline with respect to said seat whereby said port is gradually closed by said resilient member as said movable element moves toward said stationary element.

9. A control valve comprising a movable element and a stationary element; one of said elements having an inlet passage, an outlet passage, and means defining a seat provided with a port connecting said passages; the other of said elements including a slab-like resilient member including a planar surface engageable with and disengageable from said seat; said surface when disengaged from said plate being flat and positioned at an incline with respect to said seat whereby said port is gradually closed by said resilient member as said movable element moves toward said stationary element; biasing means urging said movable element away from said stationary element; magnetic means for moving said movable element toward said stationary element against the force of said biasing spring to control the opening of said port.

10. A control valve comprising a movable element and a stationary element; one of said elements having an inlet passage, an outlet passage, and means defining a seat provided with a port connecting said passages; the other of said elements including a slab-like resilient member including a planar surface engageable with and disengageable from said seat; said surface when disengaged from said plate being flat and positioned at an incline with respect to said seat whereby said port is gradually closed by said resilient member as said movable element moves toward said stationary element; said planar surface being perpendicular to the path of movement of said movable member.

11. An air data calibrator comprising a first and a second manifold, a first means for establishing a first pressure in said first manifold, a second means for establishing a second pressure in said second manifold, first servo means for maintaining said first pressure referenced to a vacuum, second servo means for maintaining said second pressure referenced to said first pressure; said first means comprising a pump having an intake and an outlet; a conduit at said intake connectible to a static adapter; an automatic valve at said intake; said automatic valve being closed when less than a predetermined vacuum is present at said conduit and being open when there is a vacuum at said conduit which exceeds said predetermined vacuum.

12. An air data calibrator comprising a first and a second manifold, a first means for establishing a first pressure in said first manifold, a second means for establishing a second pressure in said second manifold, first servo means for maintaining said first pressure referenced to a vacuum, second servo means for maintaining said second pressure referenced to said first pressure; said first means comprising a pump having an intake and an outlet; a selector valve operatively connected between said pump and said first reservoir; said selector valve being operable between a first and a second position wherein said intake and said outlet, respectively, are connected to said first reservoir whereby said first pressure is selectively below or above ambient; an automatic valve interposed between said intake and said selector valve; said automatic valve being closed when less than a predetermined vacuum is present at said intake and being open when there is a vacuum at said intake which exceeds said predetermined vacuum.

13. An air data calibrator comprising a first and a second manifold, a first means for establishing a first pressure in said first manifold, a second means for establishing a second pressure in said second manifold, first servo means for maintaining said first pressure referenced to a vacuum, second servo means for maintaining said second pressure referenced to said first pressure; said first means comprising a first pump having an intake and an outlet; means connecting said first pump intake to said first manifold and at the same time connecting said first pump outlet to ambient; said second means comprising a second pump having an intake connected to said first manifold and an outlet connected to said second manifold.

14. An air data calibrator comprising a first and a second manifold, a first means for establishing a first pressure in said first manifold, a second means for establishing a second pressure in said second manifold, first servo means for maintaining said first pressure referenced to a standard, second servo means for maintaining said second pressure referenced to said first pressure; said first means comprising a pump having an intake and an outlet; a selector valve operatively connected between said pump and said first manifold; said selector valve being operable between a first and a second position wherein said intake and said outlet, respectively, are connected to said first manifold whereby said first pressure is selectively below or above ambient.

References Cited in the file of this patent
UNITED STATES PATENTS 2,418,388    Ziebolz  ---------------- Apr. 1, 1947
2,857,131    Cole  ------------------ Oct. 21, 1958